US011938727B2

(12) United States Patent
Govyadinov et al.

(10) Patent No.: US 11,938,727 B2
(45) Date of Patent: Mar. 26, 2024

(54) CONTINUOUS FLUID RECIRCULATION AND RECIRCULATION ON-DEMAND PRIOR TO FIRING FOR THERMAL EJECTION OF FLUID HAVING CONCENTRATION OF SOLIDS

(71) Applicant: Hewlett-Packard Development Company, L.P., Spring, TX (US)

(72) Inventors: Alexander Govyadinov, Corvallis, OR (US); Alex Trubnikov, Netanya (IL); Ronald Albert Askeland, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 63 days.

(21) Appl. No.: 17/795,039

(22) PCT Filed: Feb. 14, 2020

(86) PCT No.: PCT/US2020/018428
§ 371 (c)(1),
(2) Date: Jul. 25, 2022

(87) PCT Pub. No.: WO2021/162708
PCT Pub. Date: Aug. 19, 2021

(65) Prior Publication Data
US 2023/0054818 A1 Feb. 23, 2023

(51) Int. Cl.
*B41J 2/14* (2006.01)

(52) U.S. Cl.
CPC ........ *B41J 2/14032* (2013.01); *B41J 2202/12* (2013.01)

(58) Field of Classification Search
CPC ...... B41J 2/18; B41J 2/14145; B41J 2/14032; B41J 2/1404; B41J 2202/12
See application file for complete search history.

(56) References Cited

U.S. PATENT DOCUMENTS

| | | | |
|---|---|---|---|
| 6,055,002 A | 4/2000 | Wen et al. | |
| 7,806,515 B2 | 10/2010 | Harvey et al. | |
| 8,444,259 B2 | 5/2013 | Bennett | |
| 8,814,293 B2 * | 8/2014 | Strunk | B41J 2/1404 347/6 |
| 9,090,084 B2 * | 7/2015 | Govyadinov | B41J 2/1404 |
| 9,994,020 B2 | 6/2018 | De Meutter et al. | |
| 11,345,162 B2 * | 5/2022 | Govyadinov | B41J 2/17596 |
| 2012/0274685 A1 | 11/2012 | Mis et al. | |

(Continued)

FOREIGN PATENT DOCUMENTS

| | | |
|---|---|---|
| CN | 102971150 A | 3/2013 |
| CN | 107531049 A | 1/2018 |

(Continued)

*Primary Examiner* — An H Do
(74) *Attorney, Agent, or Firm* — Foley & Lardner LLP

(57) ABSTRACT

Fluid is continuously recirculated through a thermal fluid-ejection printhead. Prior to firing a thermal resistor of the printhead to thermally eject a drop of the fluid through a nozzle of the printhead, the fluid is recirculated on-demand through a chamber of the printhead between the nozzle and the thermal resistor. The thermal resistor is fired to thermally eject the drop of the fluid through the nozzle. The fluid has a concentration of solids greater than 12% by volume.

15 Claims, 15 Drawing Sheets

(56) References Cited

U.S. PATENT DOCUMENTS

| | | | |
|---|---|---|---|
| 2018/0290458 | A1 | 10/2018 | Govyadinov et al. |
| 2019/0001692 | A1 | 1/2019 | Yamazaki et al. |

FOREIGN PATENT DOCUMENTS

| | | | |
|---|---|---|---|
| EP | 1356946 | B1 | 1/2005 |
| EP | 2414162 | B1 | 10/2014 |
| JP | 2019-151113 | A | 9/2019 |
| WO | 2013/162606 | A1 | 10/2013 |
| WO | 2017/074427 | A1 | 5/2017 |
| WO | 2019/027432 | A1 | 2/2019 |
| WO | 2019/050540 | A1 | 3/2019 |

* cited by examiner

CONTINUOUS FLUID RECIRCULATION AND RECIRCULATION ON-DEMAND PRIOR TO FIRING FOR THERMAL EJECTION OF FLUID HAVING CONCENTRATION OF SOLIDS

BACKGROUND

Printing devices, including standalone printers as well as all-in-one (AIO) printing devices that combine printing functionality with other functionality like scanning and copying, can use a variety of different printing techniques. One type of printing technology is thermal inkjet-printing technology, which is more generally a type of thermal fluid-ejection technology. A thermal fluid-ejection device, such as a printhead or a device having such a printhead, includes a number of thermal resistors and corresponding nozzles. Firing a thermal resistor can cause ejection of fluid, such as a drop thereof, from a corresponding nozzle.

DETAILED DESCRIPTION

As noted in the background, firing thermal resistors of a thermal fluid-ejection device causes ejection of fluid from nozzles of the device. Different types of thermal fluid-ejection devices, including different types of thermal inkjet-printing devices, can employ a variety of different types of fluid. For example, thermal inkjet-printing devices may use dye-based and/or pigmented inks. Dye-based inks include colorant that is fully dissolved in carrier liquid, whereas pigmented inks include a powder of solid colorant particles suspended in carrier liquid.

Inks and other fluids can vary in their concentration of solids.

Fluids like ink that have greater concentrations of solids are more likely to form viscous plugs at a fluid-ejection printhead's nozzles. A viscous plug forms when fluid sufficiently dries out at a nozzle, leaving behind a greater mass of solid particles that clog the nozzle in the form of a plug. Clogged nozzles can deleteriously affect image quality, by impeding or preventing fluid ejection through the nozzles, and/or by affecting the amount or trajectory of fluid ejected through the nozzles.

However, the desire to print with such more challenging inks has increased unimpeded. Thermal fluid-ejection devices are being called upon to eject fluids that have ever greater concentrations of solids, for instance.

Techniques described herein permit fluid-ejection devices to thermally eject fluids that have greater concentrations of solids than existing such devices, permitting thermal ejection of a wider variety of fluids. The described techniques can allow thermal fluid-ejection devices to eject types of fluid that heretofore otherwise necessitated the usage of different kinds of fluid-ejection devices, like those that employ piezoelectricity to eject fluid.

Specifically, in the techniques described herein, fluid is continuously recirculated through a thermal fluid-ejection printhead. The fluid may be continuously recirculated just through a chamber layer of the printhead, just through a device layer of the printhead, or just at a backside of the device layer. The fluid may instead be continuously recirculated both through the chamber layer and the device layer, or both through the chamber layer and at the backside of the device layer.

Furthermore, when a drop of fluid is to be ejected from the thermal fluid-ejection printhead, fluid is recirculated on-demand through a chamber prior to firing a thermal resistor to eject the fluid drop from the chamber through a nozzle. Such recirculation of fluid both continuously through the printhead and on-demand through a chamber prior to ejecting fluid from the chamber has been proven to expand the types of fluid that are thermally ejectable. For instance, fluid like ink having a concentration of solids greater than 12% by volume, and even greater than 30% by volume, is able to be thermally ejectable, which is believed to have not heretofore been possible.

Figure 1A:
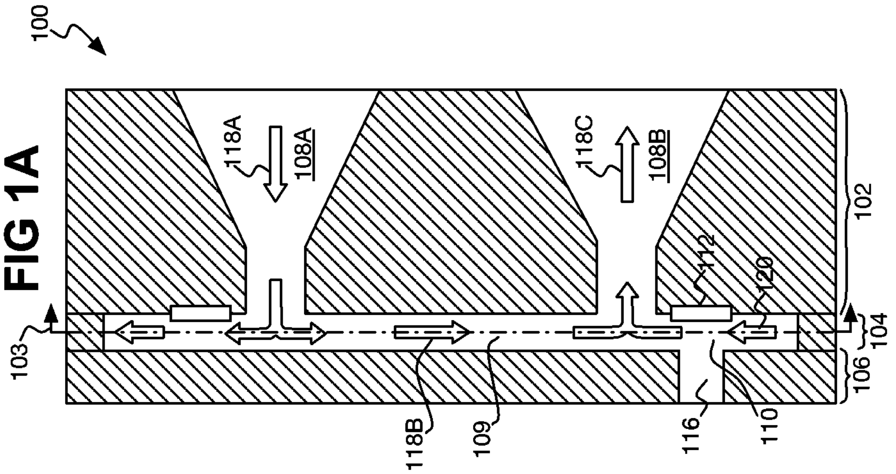
FIGS. 1A and 1B are cross-sectional side-view and top-view diagrams, respectively, of an example thermal fluid-ejection printhead in which fluid recirculation can continuously occur through a chamber layer and in which on-demand fluid recirculation can occur on-demand through a chamber prior to ejecting fluid from the chamber.
Figure 1B:
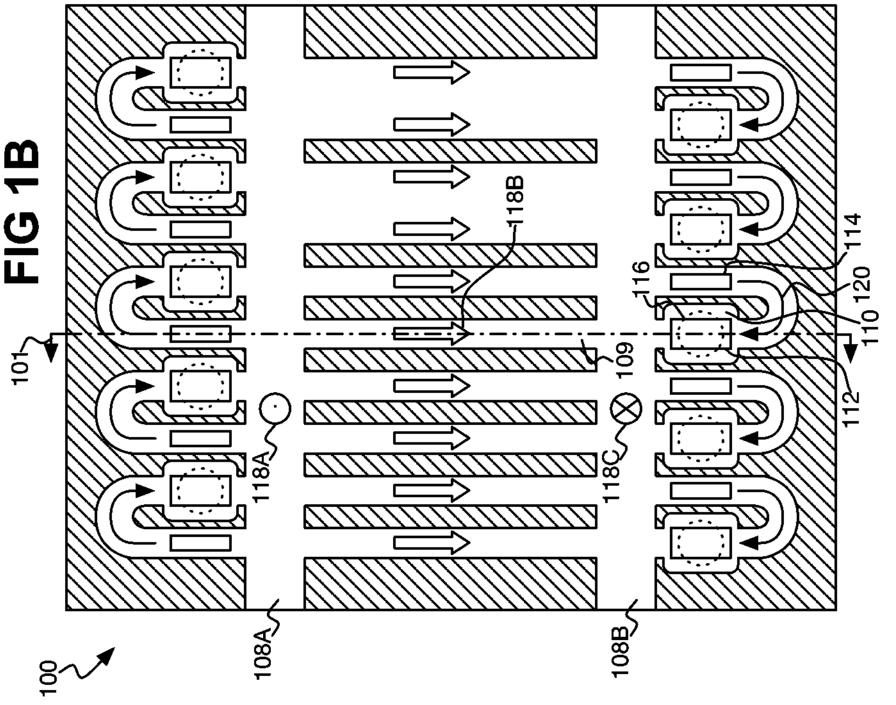

FIGS. 1A and 1B respectively show cross-sectional side and top views of an example thermal fluid-ejection printhead 100. The cross-sectional side view of FIG. 1A depicts the cross section of the printhead 100 at cross-sectional line 101 of FIG. 1B, and the cross-sectional top view of FIG. 1B depicts the cross-section of the printhead 100 at cross-sectional line 103 of FIG. 1A. The printhead 100 includes a device layer 102, a chamber layer 104, and a tophat layer 106, as depicted in FIG. 1A.

The device layer 102 is referred to as such to distinguish the layer 102 from the layers 104 and 106, and is located between the layers 104 and 106. The device layer 102 partially or completely defines slots 108A and 108B, which are collectively referred to as the slots 108. The chamber layer 104 includes channels 109, which can be of varying width and that fluidically connect the slots 108. The chamber layer 104 is referred to as such because it further includes chambers 110. The printhead 100 includes thermal resistors 112 disposed at bottoms of respective chambers 110 of the chamber layer 104, as well as corresponding microfluidic pumps 114 disposed within the chamber layer 104 per FIG. 1B.

The tophat layer 106 includes nozzles 116, which can be of varying diameter, opposite respective thermal resistors 112. The tophat layer 106 is referred to as such because it can be the topmost layer, above the layers 102 and 104. Each nozzle 116 and its corresponding thermal resistor 112 are located at opposite ends of a corresponding chamber 110. The chambers 110, the thermal resistors 112, the microfluidic pumps 114, and the nozzles 116 are disposed at outward edges of the slots 108, and there are no such components disposed between the slots 108.

In the example of FIGS. 1A and 1B, fluid continuously recirculates through the chamber layer 104, regardless of whether fluid is being ejected from any nozzle 116. Specifically, in FIG. 1A, fluid travels inwards from the slot 108A to the channels 109 per arrow 118A, across the channels 109 per arrow 118B, and outwards from the channels 109 to the slot 108B per arrow 118C. Likewise, in FIG. 1B, fluid travels upwards into the slot 108A per the tip of arrow 118A, across the channels 109 per arrow 118B, and downwards into the slot 108B per the tail of arrow 118C. Such continuous fluid recirculation can be referred to as macrofluidic recirculation, because it occurs throughout the entire thermal fluid-ejection printhead 100.

When fluid is to be ejected from a nozzle 116, a corresponding microfluidic pump 114 is actuated to also recirculate fluid on-demand through the chamber 110 at which the nozzle 116 is located, per arrow 120. Specifically, the fluid is recirculated from the slot 108 adjacent to the nozzle 116, through the chamber 110, and back to this same slot 108, per arrow 120. Such on-demand fluid recirculation can be referred to as microfluidic recirculation, because it occurs just within the chamber 110 from which fluid is to be ejected, and not through the entire printhead 100. After the on-demand fluid recirculation has occurred, the thermal resistor 112 corresponding to the nozzle 116 is fired. Firing of the thermal resistor 112 causes ejection of fluid from the chamber 110 through the nozzle 116.

Figure 2A:
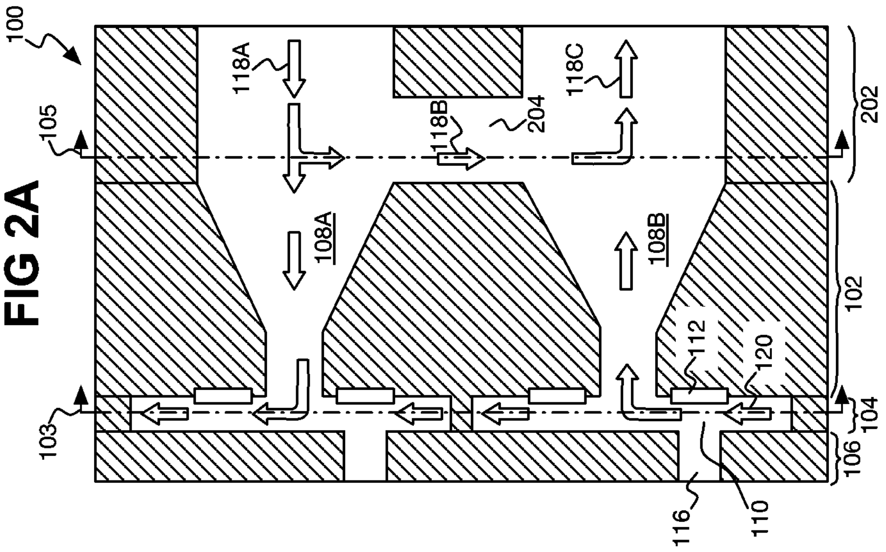
FIGS. 2A, 2B, and 2C are two cross-sectional side-view and one cross-sectional top-view diagrams, respectively, of an example thermal fluid-ejection printhead in which fluid recirculation can continuously occur at a backside of a device layer and in which on-demand fluid recirculation can occur on-demand through a chamber prior to ejecting fluid from the chamber.
Figure 2B:
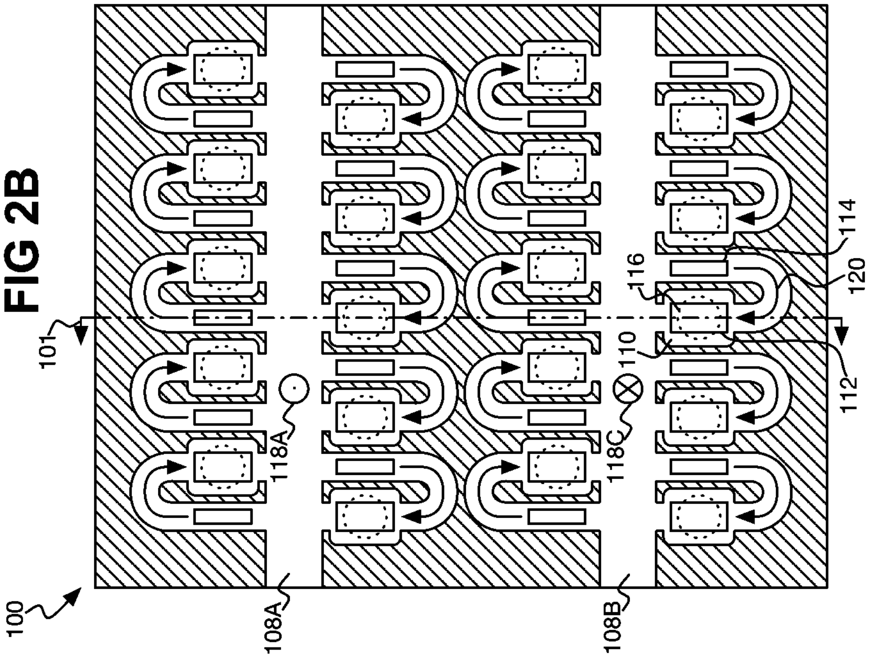
Figure 2C:
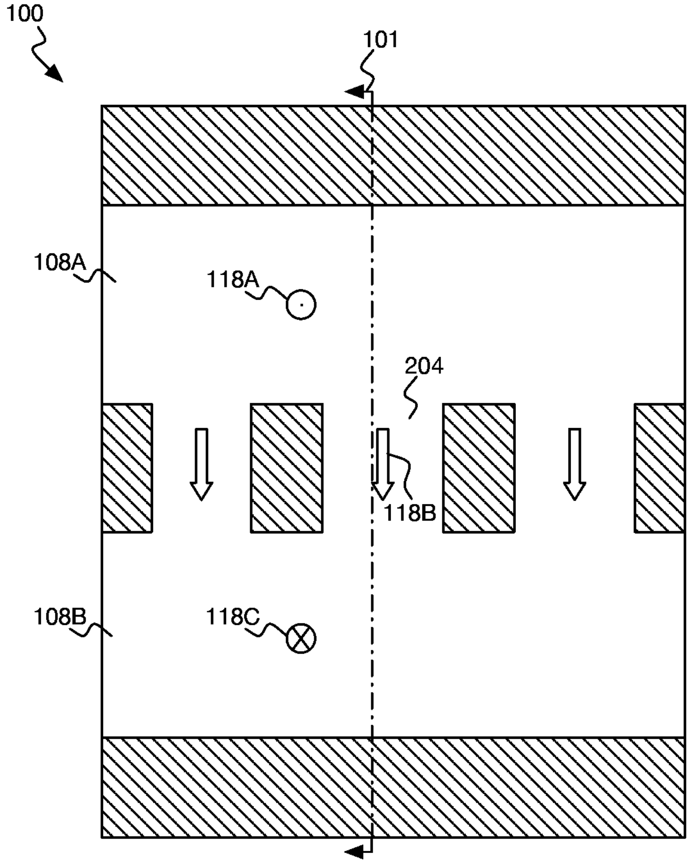

FIGS. 2A, 2B, and 2C respectively show one cross-sectional side and two cross-sectional top views of another example of the thermal fluid-ejection printhead 100. The cross-sectional side view of FIG. 2A depicts the cross section of the printhead 100 at cross-sectional line 101 of FIGS. 2B and 2C. The cross-sectional top view of FIG. 2B depicts the cross section of the printhead 100 at cross-sectional line 103 of FIG. 2A, and the cross-sectional top view of FIG. 2C depicts the cross section of the printhead 100 at cross-sectional line 105 of FIG. 2A.

The printhead 100 includes the device layer 102, the chamber layer 104, and the tophat layer 106, as well as a chiclet layer 202 at a backside of the device layer 102, as depicted in FIG. 2A. A difference between the example of FIGS. 2A, 2B, and 2C and the example of FIGS. 1A and 1B is that microfluidic recirculation occurs through the chiclet layer 202 at the backside of the device layer 102 in FIGS. 2A, 2B, and 2C. By comparison, microfluidic recirculation occurs through the chamber layer 104 in FIGS. 1A and 1B.

The device layer 102 partially defines the slots 108, and the chamber layer 104 includes the chambers 110, at the bottoms of which are disposed respective thermal resistors 112, and which have corresponding microfluidic pumps 114 per FIG. 2B. The tophat layer 106 includes the nozzles 116, which can be of varying diameter, opposite respective thermal resistors 112, with each nozzle 116 and its corresponding resistor 112 located at opposite ends of a corresponding chamber 110. The chiclet layer 202 also partially defines the slots 108, and includes channels 204 that fluidically connect the slots 108, and which can be of varying width. The chiclet layer 202 is referred to as such to distinguish the layer 202 from the other layers 102, 104, and 106. The chambers 110, the thermal resistors 112, the microfluidic pumps 114, and the nozzles 116 are disposed at both inward and outward edges of the slots 108.

In the example of FIGS. 2A, 2B, and 2C, fluid continuously recirculates through the chiclet layer 202, and thus at the backside of the device layer 102, regardless of whether fluid is being ejected from any nozzle 116. Specifically, in FIG. 2A, fluid travels inwards from the slot 108A to the channels 204 per arrow 118A, across the channels 204 per arrow 118B, and outwards from the channels 204 to the slot 108B per arrow 118C. Likewise, in FIG. 2C, fluid travels upwards into the slot 108A per the tip of arrow 118A, across the channels 204 per arrow 118B, and downwards into the slot 108B per the tail of arrow 118C.

When fluid is to be ejected from a nozzle 116, a corresponding microfluidic pump 114 is actuated to also recirculate fluid on-demand through the chamber 110 at which the nozzle 116 is located, per arrow 120. Specifically, in FIGS. 2A and 2B, the fluid is recirculated from the slot 108 adjacent to the nozzle 116, through the chamber 110, and back to this same slot 108, per arrow 120. After the on-demand fluid recirculation has occurred, the thermal resistor 112 corresponding to the nozzle 116 is fired, causing ejection of fluid from the chamber 110 through the nozzle 116.

Figure 3A:
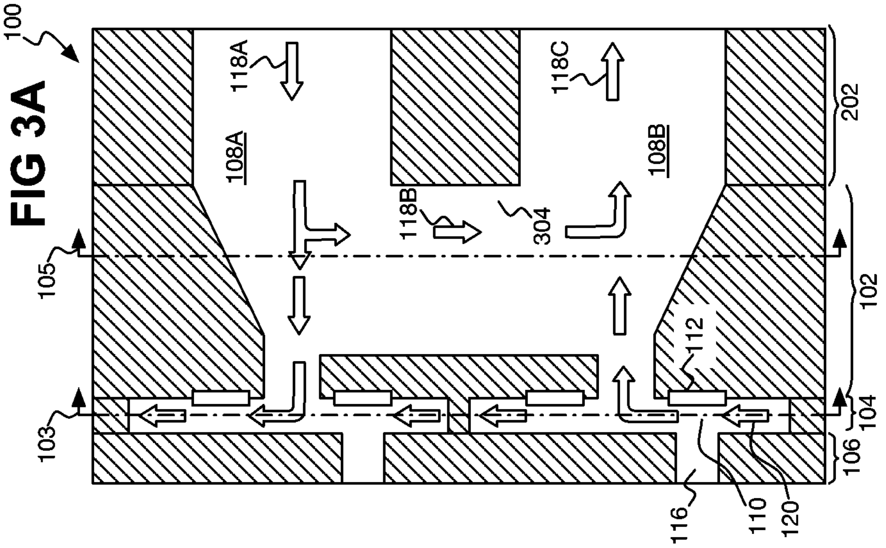
FIGS. 3A, 3B, and 3C are two cross-sectional side-view and one cross-sectional top-view diagrams, respectively, of an example thermal fluid-ejection printhead in which fluid recirculation can continuously occur through a device layer and in which on-demand fluid recirculation can occur on-demand through a chamber prior to ejecting fluid from the chamber.
Figure 3B:
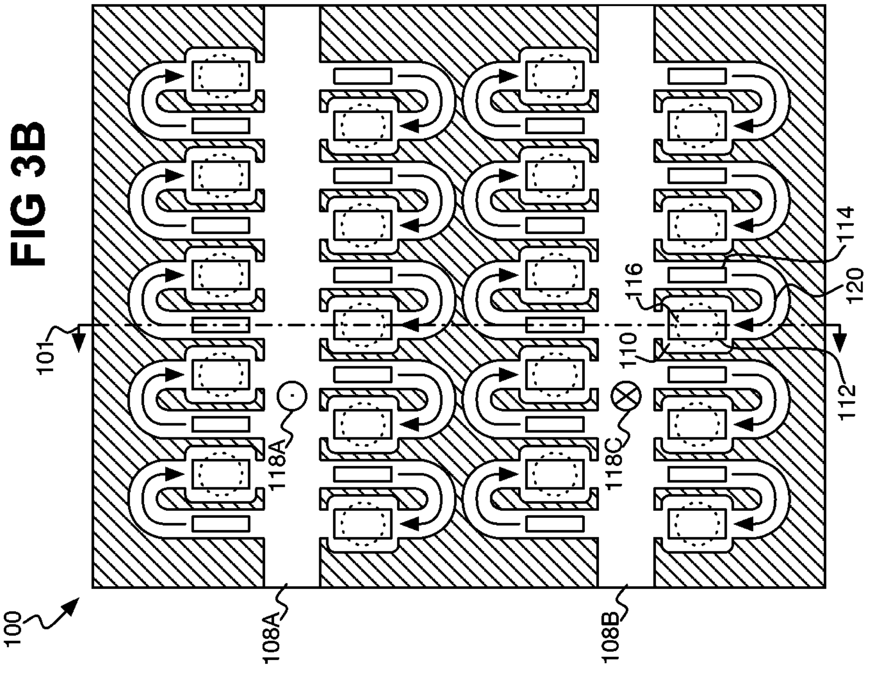
Figure 3C:
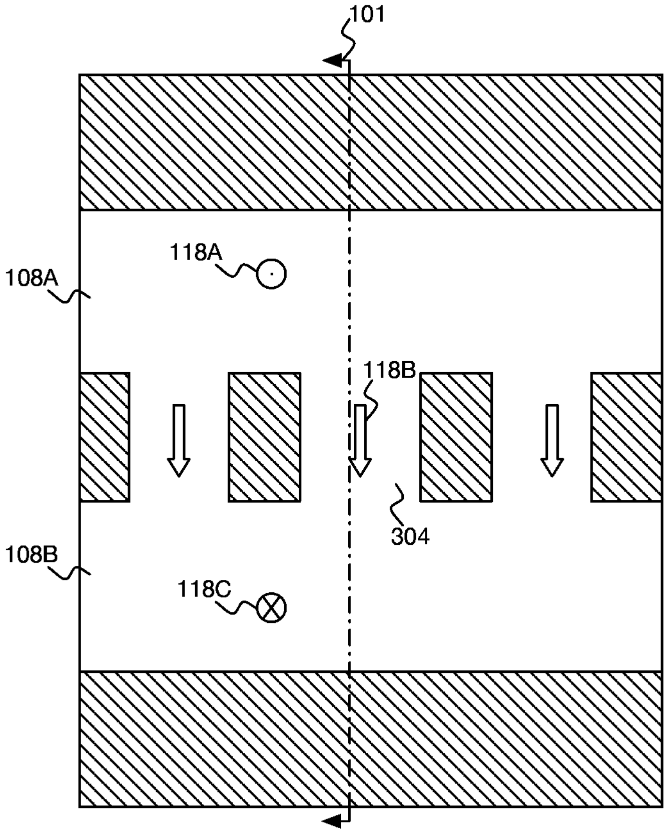

FIGS. 3A, 3B, and 3C respectively show one cross-sectional side and two cross-sectional top views of another example of the thermal fluid-ejection printhead 100. The cross-sectional view of FIG. 3A depicts the cross section of the printhead 100 at cross-sectional line 101 of FIGS. 3B and 3C. The cross-sectional top view of FIG. 3B depicts the cross section of the printhead 100 at cross-sectional line 103 of FIG. 3A, and the cross-sectional top view of FIG. 3C depicts the cross section of the printhead 100 at cross-sectional line 105 of FIG. 3A.

The printhead 100 includes the device layer 102, the chamber layer 104, the tophat layer 106, and the chiclet layer 202 at the backside of the device layer 102, as depicted in FIG. 3A. A difference between the example of FIGS. 3A, 3B, and 3C and the example of FIGS. 2A, 2B, and 2C is that macrofluidic recirculation occurs through the device layer 102 in FIGS. 3A, 3B, and 3C. By comparison, macrofluidic recirculation occurs through the chiclet layer 202 and at the backside of the device layer 102 in FIGS. 2A, 2B, and 2C.

The device layer 102 partially defines the slots 108, and includes channels 304 that fluidically connect the slots 108, which can be of varying width. The chamber layer 104 includes the chambers 110, at the bottoms of which are disposed respective thermal resistors 112, and which have corresponding microfluidic pumps 114 per FIG. 3B. The tophat layer 106 includes the nozzles 116, which can be of varying diameter, opposite respective thermal resistors 112, with each nozzle 116 and its corresponding resistor 112 located at opposite ends of a corresponding chamber 110. The chambers 110, the thermal resistors 112, the microfluidic pumps 114, and the nozzles 116 are disposed at both inward and outward edges of the slots 108. The chiclet layer 202 also partially defines the slots 108.

In the example of FIGS. 3A, 3B, and 3C, fluid continuously recirculates through the device layer 102, regardless of whether fluid is being ejected from any nozzle 116. Specifically, in FIG. 3A, fluid travels inwards from the slot 108A to the channels 304 per arrow 118A, across the channels 304 per arrow 118B, and outwards from the channels 304 to the slot 108B per arrow 118C. Likewise, in FIG. 3C, fluid travels upwards into the slot 108A per the tip of arrow 118A, across the channels 204 per arrow 118B, and downwards into the slot 108B per the tail of arrow 118C.

When fluid is to be ejected from a nozzle 116, a corresponding microfluidic pump 114 is actuated to also recirculate fluid on-demand through the chamber 110 at which the nozzle 116 is located, per arrow 120. Specifically, in FIGS. 3A and 3B, the fluid is recirculated from the slot 108 adjacent to the nozzle 116, through the chamber 110, and back to this same slot 108, per arrow 120. After the on-demand fluid recirculation has occurred, the thermal resistor 112 corresponding to the nozzle 116 is fired, causing ejection of fluid from the chamber 110 through the nozzle 116.

Figure 4A:
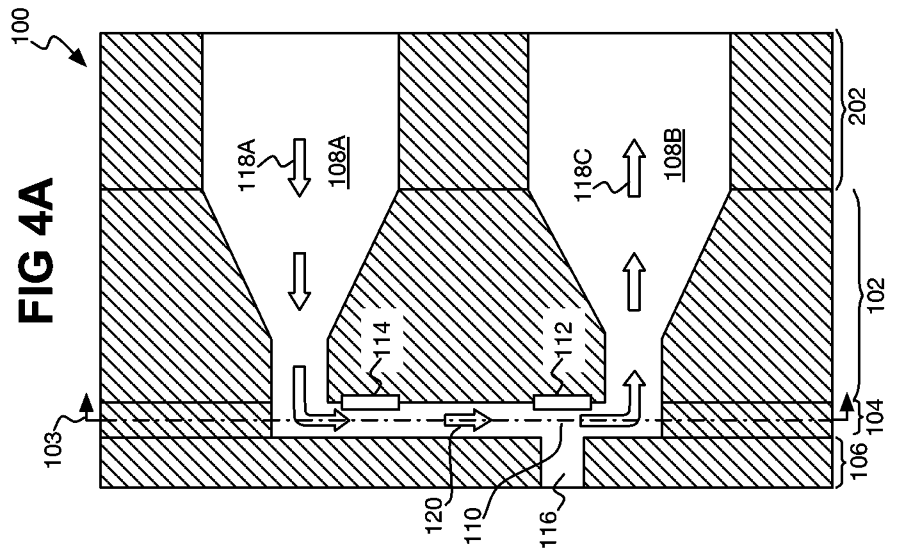
FIGS. 4A and 4B are cross-sectional side-view and cross-sectional top-view diagrams, respectively, of another example thermal fluid-ejection printhead in which fluid recirculation can continuously occur through a chamber layer and in which on-demand fluid recirculation can occur on-demand through a chamber prior to ejecting fluid from the chamber.
Figure 4B:
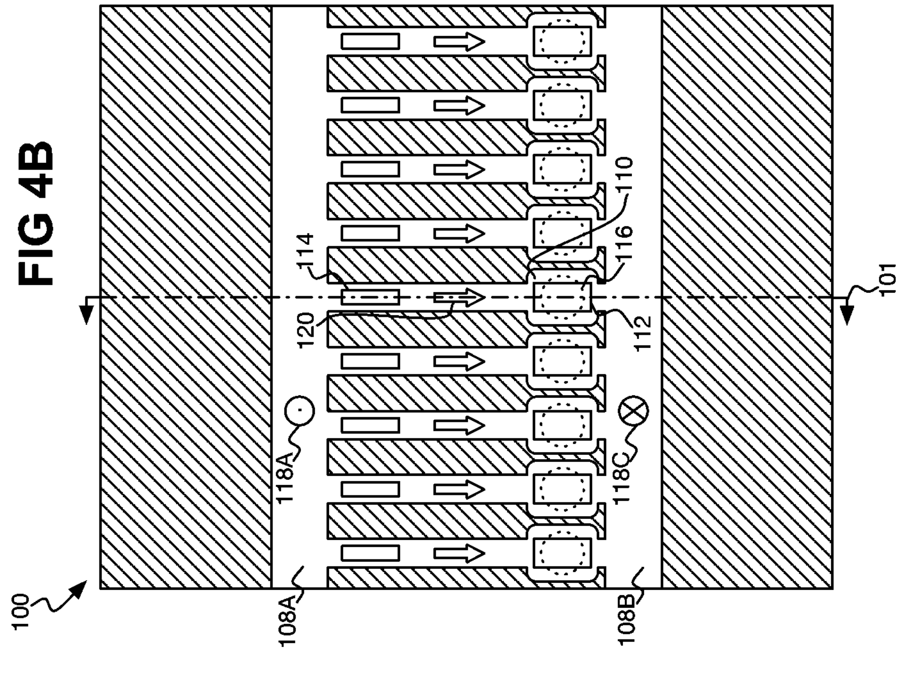

FIGS. 4A and 4B respectively show cross-sectional side and top views of another example of the thermal fluid-ejection printhead 100. The cross-sectional view of FIG. 4A depicts the cross section of the printhead 100 at cross-sectional line 101 of FIG. 4B. The cross-sectional view of FIG. 4B depicts the cross section of the printhead 100 at cross-sectional line 103 of FIG. 4A.

The printhead 100 includes the device layer 102, the chamber layer 104, the tophat layer 106, and the chiclet layer 202 at the backside of the device layer 102, as depicted in FIG. 4A. A difference between the example of FIGS. 4A and 4B and the example of FIGS. 1A and 1B is that the chambers 110, the thermal resistors 112, the microfluidic pumps 114, and the nozzles 116 are located at inside edges of the slots 108 in the example of FIGS. 4A and 4B. By comparison, the chambers 110, the thermal resistors 112, the microfluidic pumps 114, and the nozzles 116 are located at outside edges of the slots 108 in the example of FIGS. 1A and 1B.

The device layer 102 partially defines the slots 108. The chamber layer 104 includes the chambers 110, at the bottoms of which are disposed respective thermal resistors 112, and which have corresponding microfluidic pumps 114. The tophat layer 106 includes the nozzles 116, which can be of varying diameter, opposite respective thermal resistors 112, with each nozzle 116 and its corresponding resistor 112 located at opposite ends of a corresponding chamber 110. The chambers 110, the thermal resistors 112, the microfluidic pumps 114, and the nozzles 116 are disposed between the slots 108, with the chambers 110, the thermal resistors 112, and the nozzles 116 adjacent to the slot 108B and the pumps 114 adjacent to the slot 108A. The chiclet layer 202 also partially defines the slots 108.

In the example of FIGS. 4A and 4B, fluid continuously recirculates through the chamber layer 104, regardless of whether fluid is being ejected from any nozzle 116. Specifically, in FIG. 4A, fluid travels inwards from the slot 108A to chamber layer 104 per arrow 118A, across the chambers 110 of the chamber layer 104 per arrow 120, and outwards from the chamber layer 104 to the slot 108B per arrow 118C. Likewise, in FIG. 4B, fluid travels upwards into the slot 108A per the tip of arrow 118A, across the chambers 110 per arrow 120, and downwards into the slot 108B per the tail of arrow 118C.

When fluid is to be ejected from a nozzle 116, a corresponding microfluidic pump 114 is actuated to also recirculate fluid on-demand through the chamber 110 at which the nozzle 116 is located, per arrow 120. Such microfluidic recirculation through the chamber 110 is in addition to the macrofluidic recirculation through the chamber layer 104 as a whole, increasing fluidic flow through the specific chamber 110 from which fluid will be ejected. Specifically, the fluid is recirculated from the slot 108A, through the chamber 110, and to the slot 108B, per arrow 120. After the on-demand fluid recirculation has occurred, the thermal resistor 112 corresponding to the nozzle 116 is fired, causing ejection of fluid from the chamber 110 through the nozzle 116.

Figure 5A:
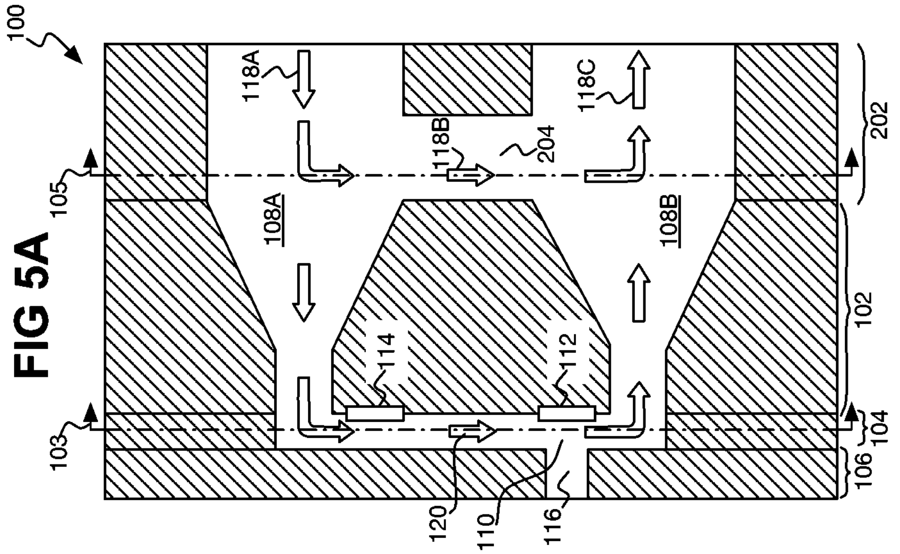
FIGS. 5A, 5B, and 5C are two cross-sectional side-view and one cross-sectional top-view diagrams, respectively, of an example thermal fluid-ejection printhead in which fluid recirculation can continuously occur both through a chamber layer and at a backside of a device layer, and in which on-demand fluid recirculation can occur on-demand through a chamber prior to ejecting fluid from the chamber.
Figure 5B:
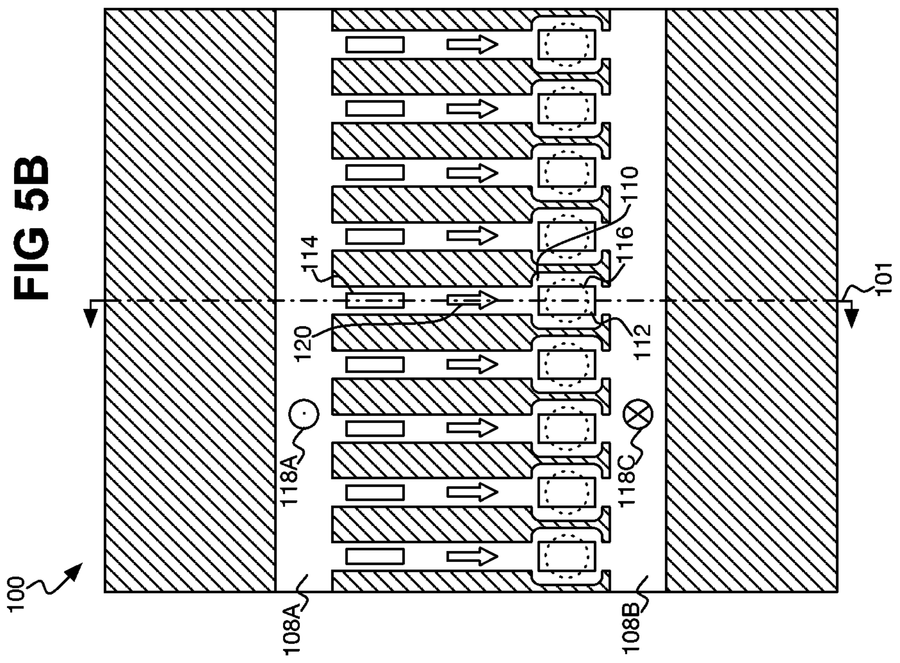
Figure 5C:
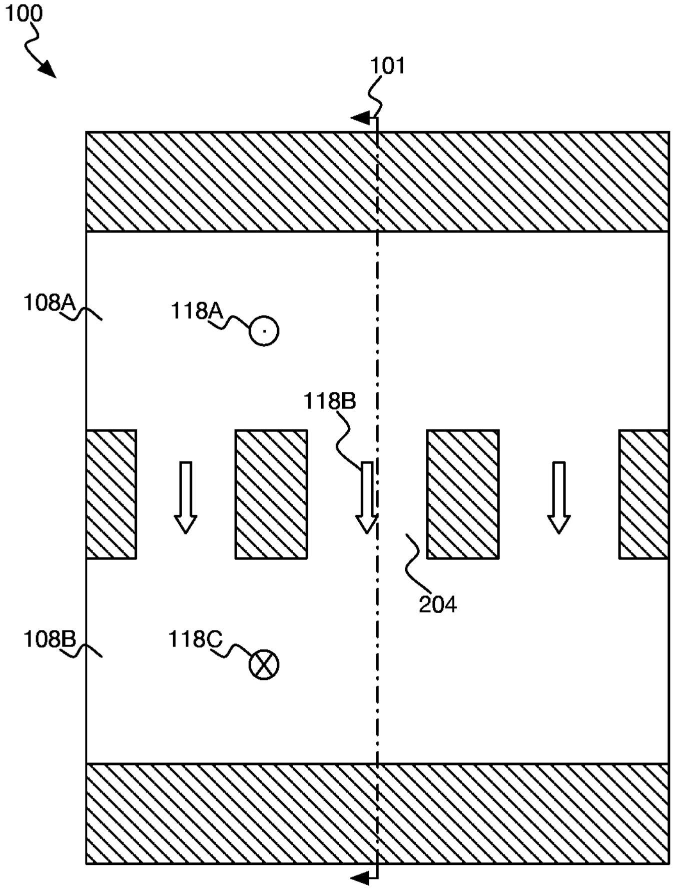

FIGS. 5A, 5B, and 5C respectively show one cross-sectional side and two cross-sectional top views of another example of the thermal fluid-ejection printhead 100. The cross-sectional view of FIG. 5A depicts the cross section of the printhead 100 at cross-sectional line 101 of FIGS. 5B and 5C. The cross-sectional view of FIG. 5B depicts the cross section of the printhead 100 at cross-sectional line 103 of FIG. 5A, and the cross-sectional view of FIG. 5C depicts the cross section of the printhead 100 at cross-sectional line 105 of FIG. 5B.

The printhead 100 includes the device layer 102, the chamber layer 104, the tophat layer 106, and the chiclet layer 202 at the backside of the device layer 102, as depicted in FIG. 5A. A difference between the example of FIGS. 5A, 5B, and 5C and the example of FIGS. 4A, 4B, and 4C is that in the example of FIGS. 5A, 5B, and 5C, macrofluidic recirculation occurs through the chiclet layer 202 at the backside of the device layer 102, in addition to through the chamber layer 104. By comparison, in the example of FIGS. 4A, 4B, and 4C, macrofluidic recirculation occurs just through the chamber layer 104.

The device layer 102 partially defines the slots 108. The chamber layer 104 includes the chambers 110, at the bottoms of which are disposed respective thermal resistors 112, and which have corresponding microfluidic pumps 114. The tophat layer 106 includes the nozzles 116, which can be of varying diameter, opposite respective thermal resistors 112, with each nozzle 116 and its corresponding resistor 112 located at opposite ends of a corresponding chamber 110. The chambers 110, the thermal resistors 112, the microfluidic pumps 114, and the nozzles 116 are disposed between the slots 108, with the chambers 110, the thermal resistors 112, and the nozzles 116 adjacent to the slot 108B and the pumps 114 adjacent to the slot 108A. The chiclet layer 202 also partially defines the slots 108, and includes the channels 204 that fluidically connect the slots 108, and which can be of varying width.

In the example of FIGS. 5A, 5B, and 5C, fluid continuously recirculates through the chamber layer 104 and also through the chiclet layer 202 and thus at the backside of the device layer 102, regardless of whether fluid is being ejected from any nozzle 116. Specifically, in FIG. 5A, fluid travels inward through the slot 108A per arrow 118A, across both the chamber layer 104 per arrow 120 and the channels 204 per arrow 118B, and outwards through the slot 108B per arrow 118C. Likewise, in FIGS. 5B and 5C, fluid travels upwards into the slot 108B per the tip of arrow 118A, across the chambers 110 per arrow 120 in FIG. 5B as well as across the channels 204 per arrow 118B in FIG. 5C, and downwards into the slot 108B per the tail of arrow 118C.

When fluid is to be ejected from a nozzle 116, a corresponding microfluidic pump 114 is actuated to also recirculate fluid on-demand through the chamber 110 at which the nozzle 116 is located, per arrow 120. Such microfluidic recirculation through the chamber 110 is in addition to the macrofluidic recirculation through the chamber layer 104 as a whole, increasing fluidic flow through the specific chamber 110 from which fluid will be ejected. Specifically, the fluid is recirculated from the slot 108A, through the chamber 110, and to the slot 108B, per arrow 120 in FIGS. 5A and 5B. After the on-demand fluid recirculation has occurred, the thermal resistor 112 corresponding to the nozzle 116 is fired, causing ejection of fluid from the chamber 110 through the nozzle 116.

Figure 6A:
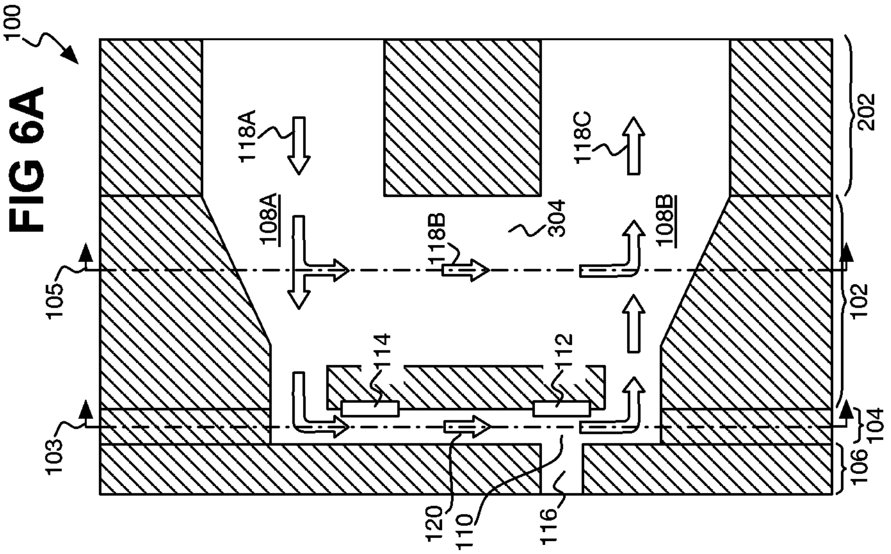
FIGS. 6A, 6B, and 6C are two cross-sectional side-view and one cross-sectional top-view diagrams, respectively, of an example thermal fluid-ejection printhead in which fluid recirculation can continuously occur through both a chamber layer and a device layer, and in which on-demand fluid recirculation can occur on-demand through a chamber prior to ejecting fluid from the chamber.
Figure 6B:
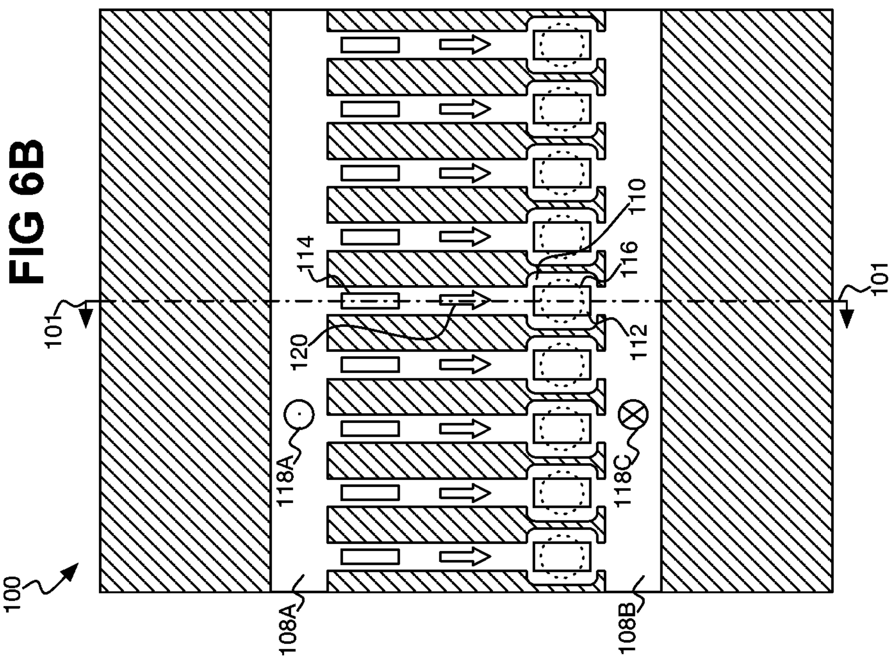

FIGS. 6A and 6B respectively show one cross-sectional side and two cross-sectional top views of another example of the thermal fluid-ejection printhead 100. The cross-sectional view of FIG. 6A depicts the cross section of the printhead 100 at cross-sectional line 101 of FIGS. 6B and 6C. The cross-sectional view of FIG. 6B depicts the cross section of the printhead 100 at cross-sectional line 103 of FIG. 6A, and the cross-sectional view of FIG. 6C depicts the cross section of the printhead 100 at cross-sectional line 105 of FIG. 6A.

The printhead 100 includes the device layer 102, the chamber layer 104, the tophat layer 106, and the chiclet layer 202 at the backside of the device layer 102, as depicted in FIG. 6A. A difference between the example of FIGS. 6A, 6B, and 6C and the example of FIGS. 5A, 5B, and 5C is that in FIGS. 6A, 6B, and 6C macrofluidic recirculation occurs through the device layer 102 in addition to through the chamber layer 104. By comparison, in the example of FIGS. 5A, 5B, and 5C, macrofluidic recirculation occurs through the chiclet layer 202 at the backside of the device layer 104, in addition to through the chamber layer 104.

The device layer 102 partially defines the slots 108, and includes the channels 304 that fluidically connect the slots 108, which can be of varying width. The chamber layer 104 includes the chambers 110, at the bottoms of which are disposed respective thermal resistors 112, and which have corresponding microfluidic pumps 114. The tophat layer 106 includes the nozzles 116, which can be of varying diameter, opposite respective thermal resistors 112, with each nozzle 116 and its corresponding resistor 112 located at opposite ends of a corresponding chamber 110. The chambers 110, the thermal resistors 112, the microfluidic pumps 114, and the nozzles 116 are disposed between the slots 108, with the chambers 110, the thermal resistors 112, and the nozzles 116 adjacent to the slot 108B and the pumps 114 adjacent to the slot 108A. The chiclet layer 202 also partially defines the slots 108.

Figure 6C:
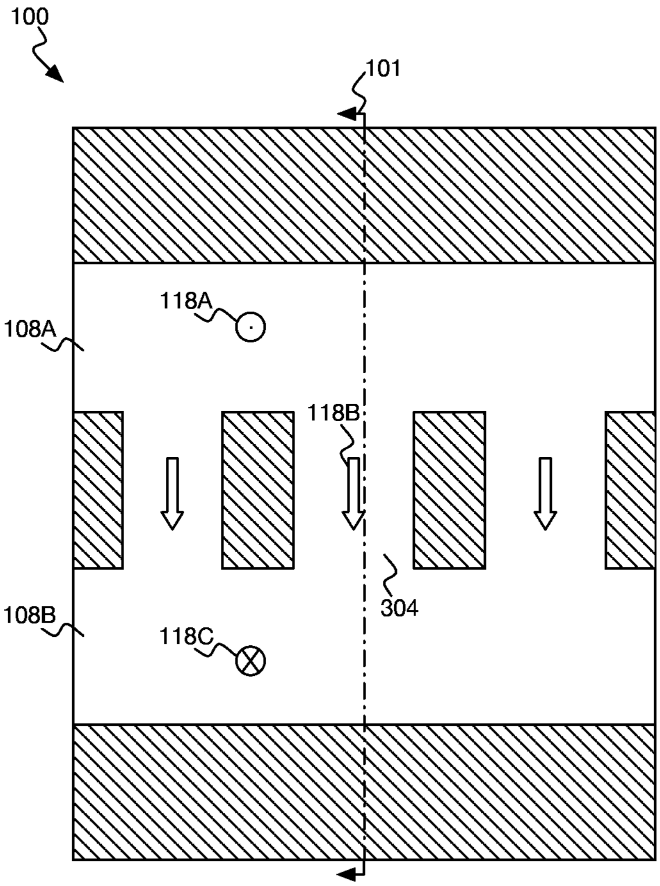

In the example of FIGS. 6A, 6B, and 6C, fluid continuously recirculates through the chamber layer 104 and also through the device layer 102, regardless of whether fluid is being ejected from any nozzle 116. Specifically, in FIG. 6A, fluid travels inward through the slot 108A per arrow 118A, across both the chamber layer 104 per arrow 120 and the channels 304 per arrow 118B, and outwards through the slot 108B per arrow 118C. Likewise, in FIGS. 6B and 6C, fluid travels upwards into the slot 108B per the tip of arrow 118A, across the chambers 110 per arrow 120 in FIG. 6B as well as across the channels 304 per arrow 118B in FIG. 6C, and downwards into the slot 108B per the tail of arrow 118C.

When fluid is to be ejected from a nozzle 116, a corresponding microfluidic pump 114 is actuated to also recirculate fluid on-demand through the chamber 110 at which the nozzle 116 is located, per arrow 120. Such microfluidic recirculation through the chamber 110 is in addition to the macrofluidic recirculation through the chamber layer 104 as a whole, increasing fluidic flow through the specific chamber 110 from which fluid will be ejected. Specifically, the fluid is recirculated from the slot 108A, through the chamber 110, and to the slot 108B, per arrow 120 in FIGS. 6A and 6B. After the on-demand fluid recirculation has occurred, the thermal resistor 112 corresponding to the nozzle 116 is fired, causing ejection of fluid from the chamber 110 through the nozzle 116.

Figure 7A:
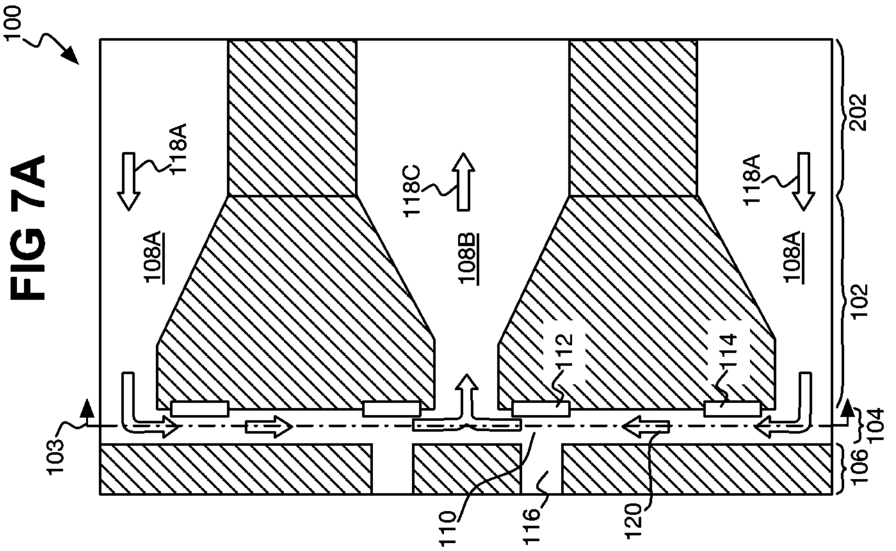
FIGS. 7A and 7B are cross-sectional side-view and top-view diagrams, respectively, of another example thermal fluid-ejection printhead in which fluid recirculation can continuously occur through a chamber layer and in which on-demand fluid recirculation can occur on-demand through a chamber prior to ejecting fluid from the chamber.
Figure 7B:
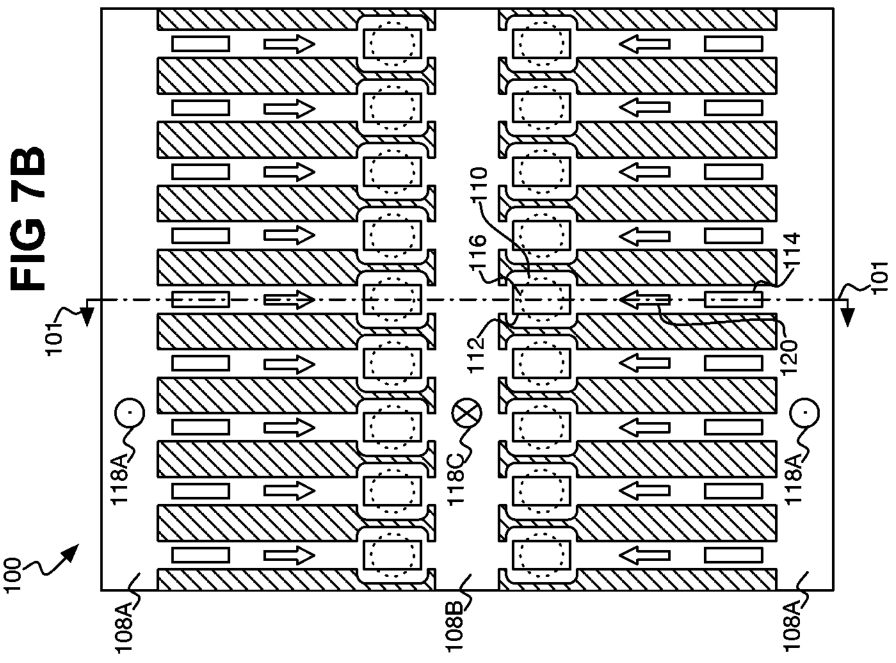

FIGS. 7A and 7B respectively show cross-sectional side and top views of another example of the thermal fluid-ejection printhead 100. The cross-sectional view of FIG. 7A depicts the cross section of the printhead 100 at cross-sectional line 101 of FIG. 7B. The cross-sectional view of FIG. 7B depicts the cross section of the printhead 100 at cross-sectional line 103 of FIG. 7A.

The printhead 100 includes the device layer 102, the chamber layer 104, the tophat layer 106, and the chiclet layer 202 at the backside of the device layer 102, as depicted in FIG. 7A. A difference between the example of FIGS. 7A and 7B and the example of FIGS. 1A and 1B is that in FIGS. 7A and 7B there are two slots 108A and one slot 108B. By comparison, in FIGS. 1A and 1B, there is one slot 108A and one slot 108B.

The device layer 102 partially defines two slots 108A and the slot 108B. The chamber layer 104 includes the chambers 110, at the bottoms of which are disposed respective thermal resistors 112, and which have corresponding microfluidic pumps 114. The tophat layer 106 includes the nozzles 116, which can be of varying diameter, opposite respective thermal resistors 112, with each nozzle 116 and its corresponding resistor 112 located at opposite ends of a corresponding chamber 110. The chambers 110, the thermal resistors 112, the microfluidic pumps 114, and the nozzles 116 are disposed between either slot 108A and the slot 108B, with the chambers 110, the thermal resistors 112, and the nozzles 116 adjacent to the slot 108B and the pumps 114 adjacent to either slot 108A. The chiclet layer 202 also partially defines the slots 108.

In the example of FIGS. 7A and 7B, fluid continuously recirculates through the chamber layer 104, regardless of whether fluid is being ejected from any nozzle 116. Specifically, in FIG. 7A, fluid travels inwards from both slots 108A to the chamber layer 104 per arrows 118A, across the chambers 110 of the chamber layer 104 per arrow 120, and outward from the chamber layer 104 to the slot 108B per arrow 118C. Likewise, in FIG. 7B, fluid travels upwards into the slots 108A per the tips of arrows 118A, across the chambers 110 per arrow 120, and downwards into the slot 108B per the tail of arrow 118C.

When fluid is to be ejected from a nozzle 116, a corresponding microfluidic pump 114 is actuated to also recirculate fluid on-demand through the chamber 110 at which the nozzle 116 is located, per arrow 120. Such microfluidic recirculation through the chamber 110 is in addition to the macrofluidic recirculation through the chamber layer 104 as a whole, increasing fluidic flow through the specific chamber 110 from which fluid will be ejected. Specifically, the fluid is recirculated from the slot 108A adjacent to the corresponding pump 114, through the chamber 110, and to the slot 108B, per arrow 120. After the on-demand fluid recirculation has occurred, the thermal resistor 112 corresponding to the nozzle 116 is fired, causing ejection of fluid from the chamber 110 through the nozzle 116.

Figure 8A:
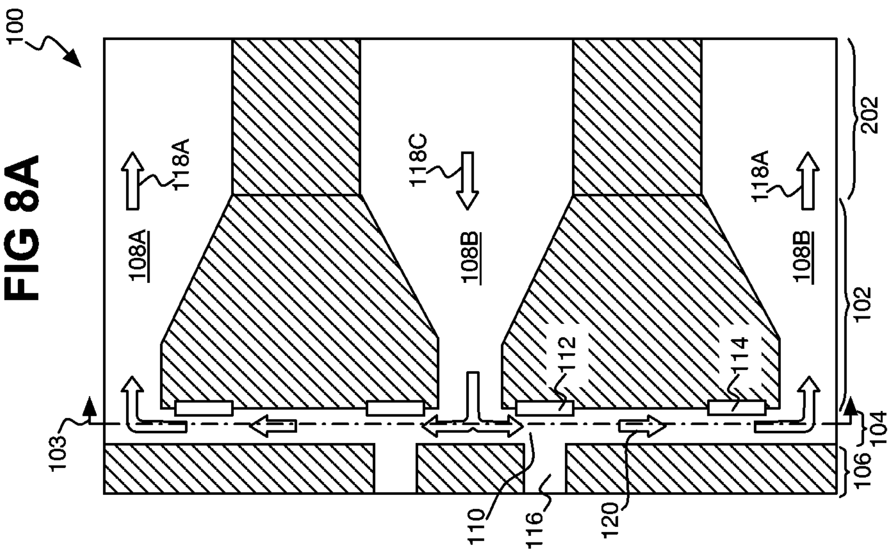
FIGS. 8A and 8B are cross-sectional side-view and top-view diagrams, respectively, of another example thermal fluid-ejection printhead in which fluid recirculation can continuously occur through a chamber layer and in which on-demand fluid recirculation can occur on-demand through a chamber prior to ejecting fluid from the chamber.
Figure 8B:
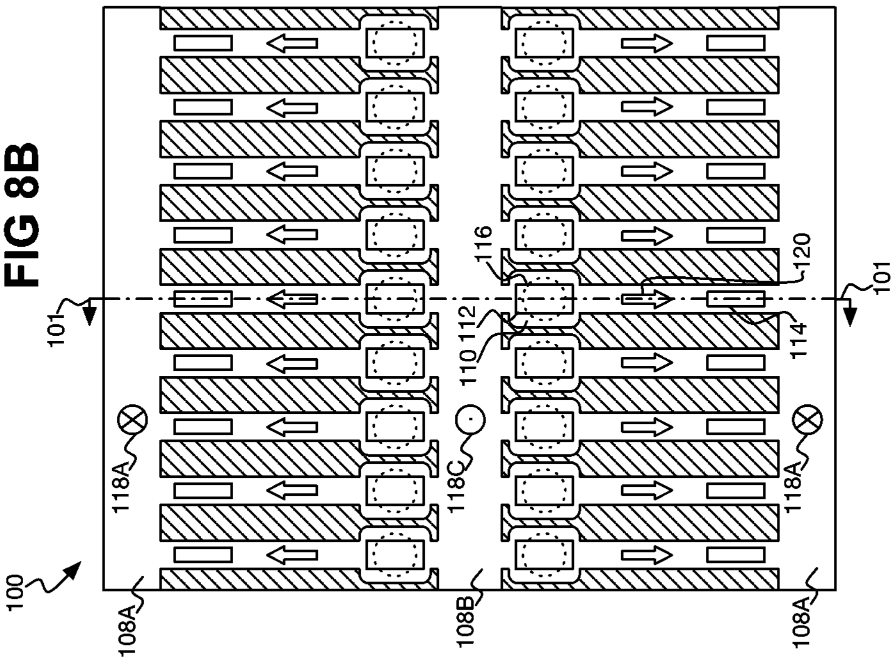

FIGS. 8A and 8B respectively show cross-sectional side and top views of another example of the thermal fluid-ejection printhead 100. The cross-sectional view of FIG. 8A depicts the cross section of the printhead 100 at cross-sectional line 101 of FIG. 8B. The cross-sectional view of FIG. 8B depicts the cross section of the printhead 100 at cross-sectional line 103 of FIG. 8A.

The printhead 100 includes the device layer 102, the chamber layer 104, the tophat layer 106, and the chiclet layer 202 at the backside of the device layer 102, as depicted in FIG. 8A. A difference between the example of FIGS. 8A and 8B and the example of FIGS. 7A and 7B is that in FIGS. 8A and 8B the slots 108A are fluidic inlet slots and the slot 108B is a fluidic outlet slot. By comparison, in the example of FIGS. 7A and 7B, the slots 108A are fluidic outlet slots and the slot 108B is a fluidic inlet slot.

The device layer 102 partially defines the two slots 108A and the slot 108B. The chamber layer 104 includes the chambers 110, at the bottoms of which are disposed respective thermal resistors 112, and which have corresponding microfluidic pumps 114. The tophat layer 106 includes the nozzles 116, which can be of varying diameter, opposite respective thermal resistors 112, with each nozzle 116 and its corresponding resistor 112 located at opposite ends of a corresponding chamber 110. The chambers 110, the thermal resistors 112, the microfluidic pumps 114, and the nozzles 116 are disposed between either slot 108A and the slot 108B, with the chambers 110, the thermal resistors 112, and the nozzles 116 adjacent to either slot 108A and the pumps 114 adjacent to the slot 108B. The chiclet layer 202 also partially defines the slots 108.

In the example of FIGS. 8A and 8B, fluid continuously recirculates through the chamber layer 104, regardless of whether fluid is being ejected from any nozzle 116. Specifically, in FIG. 8A, fluid travels inwards from the slot 108B to the chamber layer 104 per arrow 118C, across the chambers 110 of the chamber layer 104 per arrow 120, and outward from the chamber layer 104 to the slots 108A per arrows 118A. Likewise, in FIG. 8B, fluid travels upwards into the slot 108B per the tip of arrow 118C, across the chambers 110 per arrow 120, and downwards into the slots 108A per the tails of arrows 118A.

When fluid is to be ejected from a nozzle 116, a corresponding microfluidic pump 114 is actuated to also recirculate fluid on-demand through the chamber 110 at which the nozzle 116 is located, per arrow 120. Such microfluidic recirculation through the chamber 110 is in addition to the macrofluidic recirculation through the chamber layer 104 as a whole, increasing fluidic flow through the specific chamber 110 from which fluid will be ejected. Specifically, the fluid is recirculated from the slot 108B, through the chamber 110, and to the slot 108A adjacent to the chamber 110, per arrow 120. After the on-demand fluid recirculation has occurred, the thermal resistor 112 corresponding to the nozzle 116 is fired, causing ejection of fluid from the chamber 110 through the nozzle 116.

The examples of the thermal fluid-ejection printhead 100 that have described can be variously combined and modified. That is, the examples are not discretely separate implementations. The thermal fluid-ejection printhead 100 permits thermal ejection of a wider variety of fluid, like ink, as compared to other types of thermal fluid-ejection printheads, including those in which fluid recirculation occurs just continuously or just on-demand.

Figure 9A:
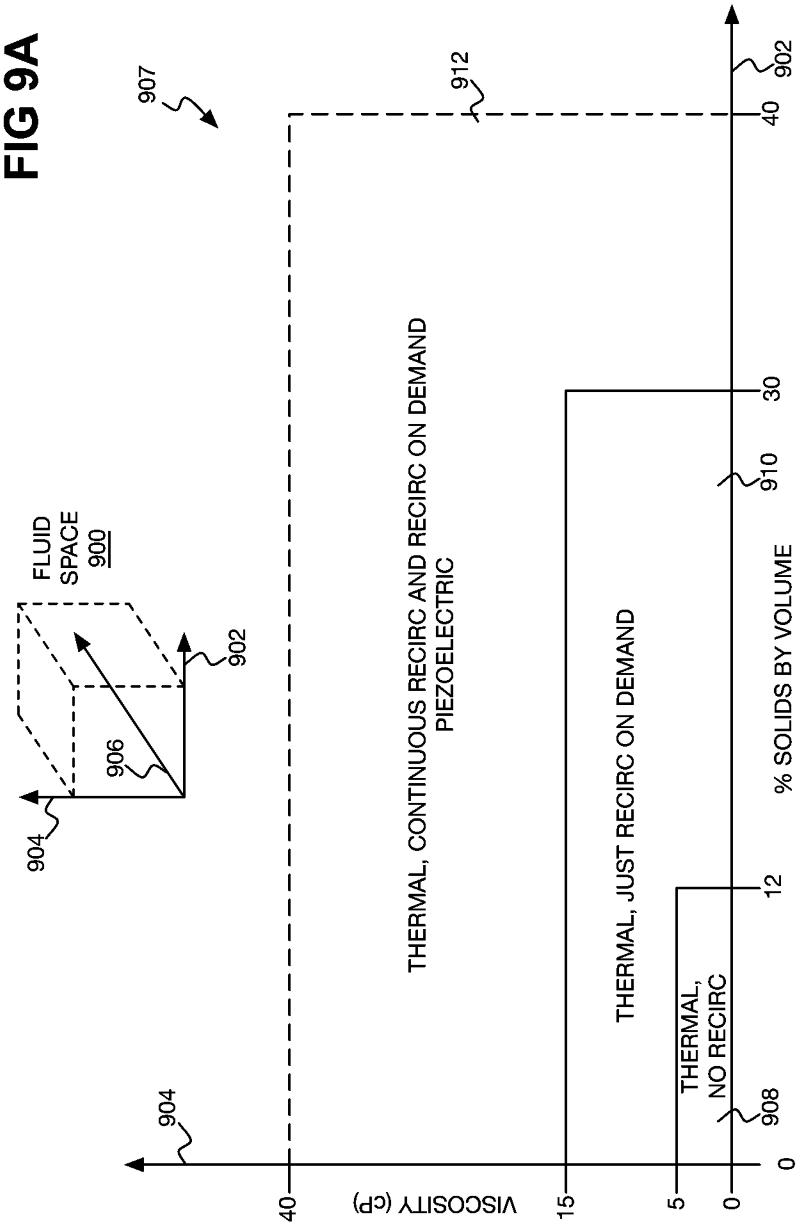
FIGS. 9A and 9B are diagrams depicting an example fluid space of a thermal fluid-ejection printhead in which fluid recirculation can occur both continuously and on demand.
Figure 9B:
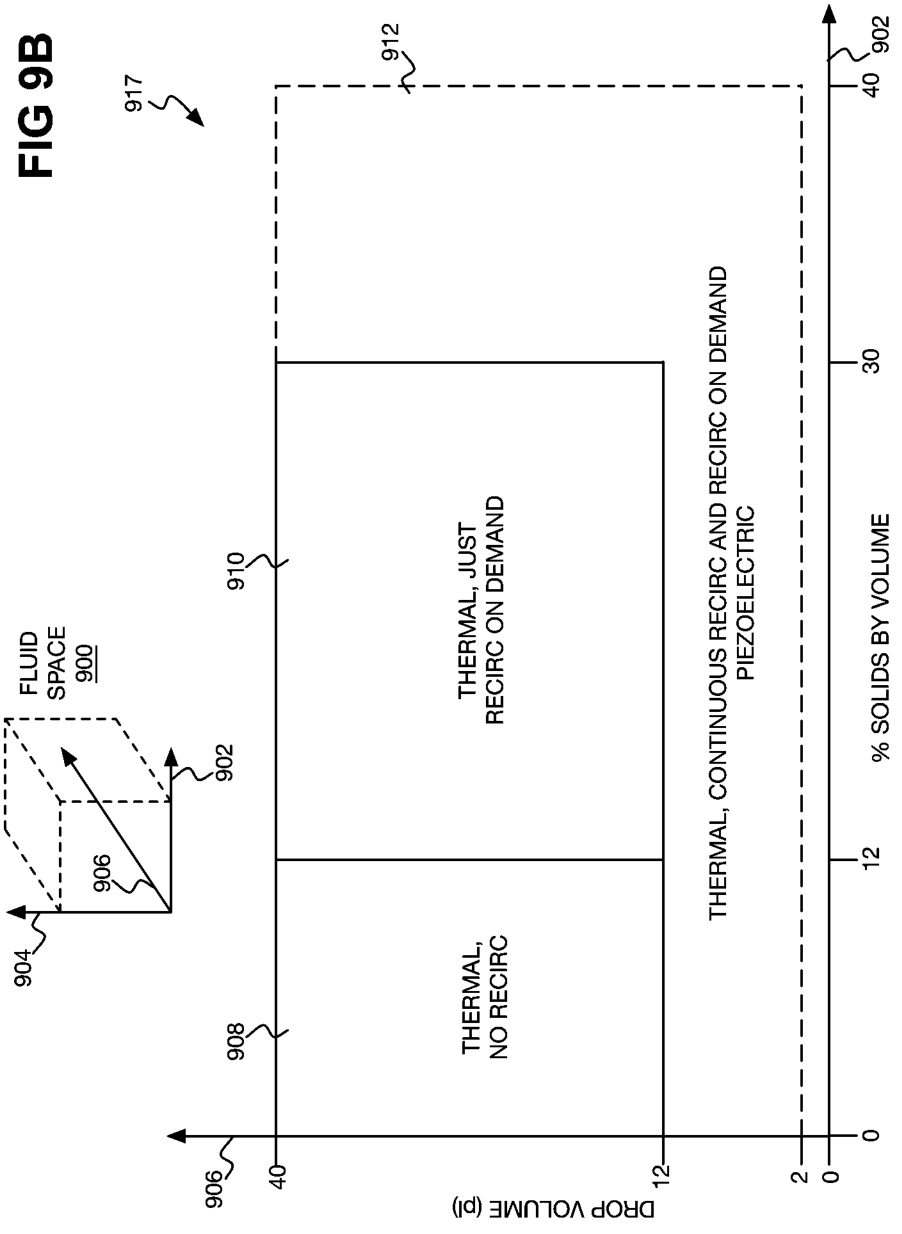

FIGS. 9A and 9B are graphs depicting an example space 900 of fluid that the thermal fluid-ejection printhead 100 can eject, as compared to other types of thermal fluid-ejection printheads and piezoelectric fluid-ejection printheads. The fluid space 900 is three-dimensionally defined over an x-axis 902, a y-axis 904, and a z-axis 906. FIG. 9A shows the two-dimensional plane 907 defined by the x-axis 902 and the y-axis 904 of the fluid space 900, and FIG. 9B shows the two-dimensional plane 917 defined by the x-axis 902 and the z-axis 906 of the fluid space 900. The x-axis 902 denotes concentration of solids by volume, as the percentage of the total volume within the fluid that the solids occupy. The y-axis 904 denotes viscosity of the fluid in centipoise (cP). The z-axis 906 denotes drop volume in picoliters (pl).

The fluid space 900 includes three regions 908, 910, and 912. The region 908 specifies fluids that may be able to be ejected by thermal fluid-ejection printheads in which no fluid recirculation occurs. The region 908 encompasses fluids having concentrations of solids no greater than 12% by volume, viscosities no greater than 5 cP per FIG. 9A, and drop volumes no less than 12 pl per FIG. 9B (smaller drop volumes are more difficult to eject than larger drop volumes). The region 910 specifies fluids that may be able to be ejected by thermal fluid-ejection printheads in which through-chamber recirculation on demand occurs but in which no continuous fluid recirculation occurs. The region 910 is inclusive of the region 908, and encompasses fluids having concentrations of solids no greater than 30% by volume, viscosities no greater than 15 cP per FIG. 9A, and drop volumes no less than 12 pl per FIG. 9B.

The region 912 specifies fluids that can be ejected by the examples of the thermal fluid-ejection printhead 100 that have been described, in which both on-demand and continuous fluid recirculation occurs. The region 912 further specifies fluids that may be able to be ejected by piezoelectric fluid-ejection printheads. The region 912 is inclusive of the regions 908 and 910, and encompasses fluids having concentrations of solids greater than 30% by volume, viscosities greater than 15 cP per FIG. 9A, and drop volumes as low as 2 pl per FIG. 9B. The region 912 potentially encompasses fluids having concentrations of solids exceeding 40% by volume, viscosities exceeding 40 cP, and/or drop volumes less than 2 pl, which is why the respective bounds of the region 912 are indicated by dotted lines in FIGS. 9A and 9B.

FIGS. 9A and 9B thus show that the examples of the thermal fluid-ejection printhead 100 that have been described greatly expand the space 900 of fluids that are thermally ejectable as compared to thermal fluid-ejection printheads in which both continuous and on-demand fluid recirculation do not occur. Furthermore, FIGS. 9A and 9B show that the space 900 of fluids that the thermal fluid-ejection printhead 100 can eject rivals if not exceeds that of fluids which piezoelectric fluid-ejection printheads may be able to eject. In such instances, fluid-ejection devices using thermal fluid ejection may be substituted for devices that employ piezoelectric fluid ejection, with resulting potential benefits in cost, performance, and reliability.

Examples of fluids that the thermal fluid-ejection printhead 100 can successfully eject include water-based ultraviolet (WBUV)-curable ink, white ink, and clear varnish. Such WBUV-curable ink may include polyurethane dispersion (PUD) particles. Such white ink may include titanium dioxide particles or other types of white pigment particles, and may also include binders like PUD particles and latex particles. Such clear varnish may include concentrations of water-dispersible monomers or other types of water-dispersible solids. Other examples of fluids that the thermal fluid-ejection printhead 100 can successfully eject into color inks, such as cyan, magenta, yellow, and black inks, having high concentrations (e.g., 16% or 24% by volume) of binders like PUD particles and latex particles.

Figure 10:
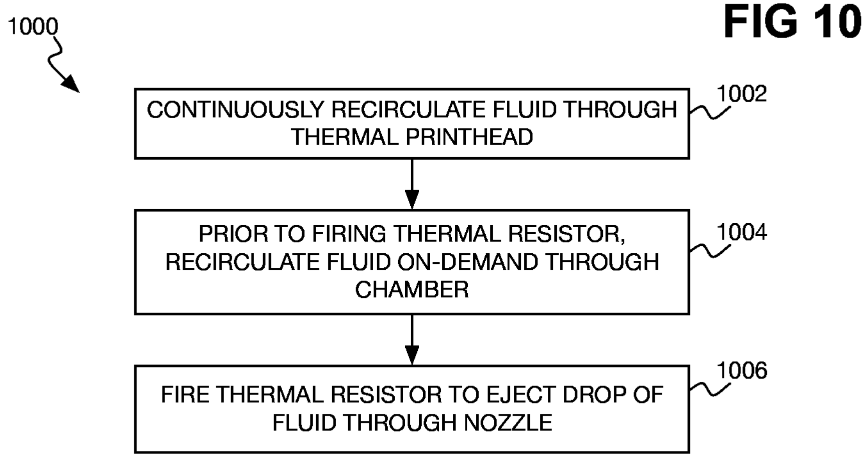
FIG. 10 is a flowchart of an example method for ejecting fluid from a thermal fluid-ejection printhead in which fluid recirculation can occur both continuously and on demand.

FIG. 10 shows an example method 1000 for ejecting fluid using the thermal fluid-ejection printhead 100 that has been described. The fluid may have a concentration of solids greater than 12%. The method 1000 includes continuously recirculating fluid through the thermal fluid-ejection printhead 100 (1002). The method 1000 includes, prior to firing a thermal resistor 112 of the printhead 100 to thermally eject a drop of the fluid through a nozzle 116, recirculating the fluid on-demand through a chamber 110 between the nozzle 116 and the resistor 112. The method 1000 includes then firing the thermal resistor 112 to thermally eject the drop of the fluid through the nozzle 116 (1006).

Figure 11:
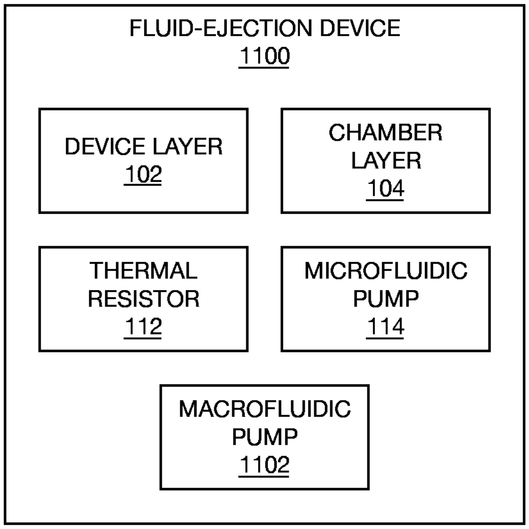
FIG. 11 is a block diagram of an example thermal fluid-ejection device in which fluid recirculation can occur both continuously and on demand.

FIG. 11 shows an example fluid-ejection device 1100. The device 100 may be a thermal inkjet-printing device, for example. The fluid-ejection device 100 includes a device layer 102 and a chamber layer 104 fluidically connected to the device layer 102. The device 100 includes a thermal resistor 112 that is fired to eject fluid through a nozzle 116, and a microfluidic pump 114 at the chamber layer 104 to recirculate the fluid on-demand prior to firing of the resistor 112.

The fluid-ejection device 100 includes another, macrofluidic pump 1102 to continuously recirculate the fluid. The macrofluidic pump 1102 may continuously recirculate the fluid through the chamber layer 104, through the device layer 102, at a backside of the device layer 102, through both the chamber layer 104 and the device layer 102, or both through the chamber layer 104 and at the backside of the device layer 102. The fluid may have a concentration of solids greater than 12% by volume.

The techniques that have been described herein permit an expanded space of fluids that can be thermally ejected. In accordance these techniques, fluid is continuously recirculated throughout a thermal fluid-ejection printhead. The fluid is also recirculated on-demand within a chamber between a thermal resistor and a nozzle, prior to firing the thermal resistor to eject a drop of the fluid through the nozzle.

We claim:

1. A method comprising:

continuously recirculating fluid through a thermal fluid-ejection printhead;

prior to firing a thermal resistor of the printhead to thermally eject a drop of the fluid through a nozzle of the printhead, recirculating the fluid on-demand through a chamber of the printhead between the nozzle and the thermal resistor; and firing the thermal resistor to thermally eject the drop of the fluid through the nozzle, wherein the fluid has a concentration of solids greater than 12% by volume.

2. The method of claim 1, wherein the concentration of solids within the fluid is greater than 30% by volume.

3. The method of claim 1, wherein the fluid has a viscosity greater than 5 centipoise.

4. The method of claim 1, wherein the fluid has a viscosity greater than 15 centipoise.

5. The method of claim 1, wherein the drop of the fluid thermally ejected through the nozzle has a drop volume less than 12 picoliters.

6. The method of claim 1, wherein the drop is unable to be thermally ejected without the fluid both continuously recirculating and recirculating on-demand prior to firing the thermal resistor.

7. The method of claim 1, wherein continuous recirculation of the fluid and recirculation of the fluid on-demand permits thermal fluid ejection of same types of fluid that are otherwise just piezoelectrically ejectable.

8. The method of claim 1, wherein the fluid comprises a white fluid having titanium dioxide particles.

9. The method of claim 1, wherein the fluid comprises a water-based ultraviolet (WBUV)-curable fluid.

10. The method of claim 1, wherein the fluid comprises a fluid having polyurethane dispersion (PUD) particles.

11. The method of claim 1, wherein the fluid comprises a fluid having latex particles.

12. The method of claim 1, wherein the fluid comprises a fluid having pigment particles.

13. The method of claim 1, wherein the fluid comprises ink.

14. A fluid-ejection device comprising:

a device layer having a backside;

a chamber layer fluidically connected to the device layer and comprising;

a thermal resistor that is fired to eject fluid through a nozzle;

a microfluidic pump at the chamber layer to recirculate the fluid on-demand prior to firing of the thermal resistor; and a macrofluidic pump to continuously recirculate the fluid through the chamber layer, through the device layer, at the backside of the device layer, through both the chamber layer and the device layer, or both through the chamber layer and at the backside of the device layer, wherein the fluid has a concentration of solids greater than 12% by volume.

15. The fluid-ejection device of claim 14, wherein the concentration of solids within the fluid is greater than 30% by volume.

* * * * *